Dec. 2, 1947.　　　　E. E. FOSTER　　　　2,431,689
WELDING RHEOSTAT
Filed Aug. 16, 1944　　　　2 Sheets-Sheet 1
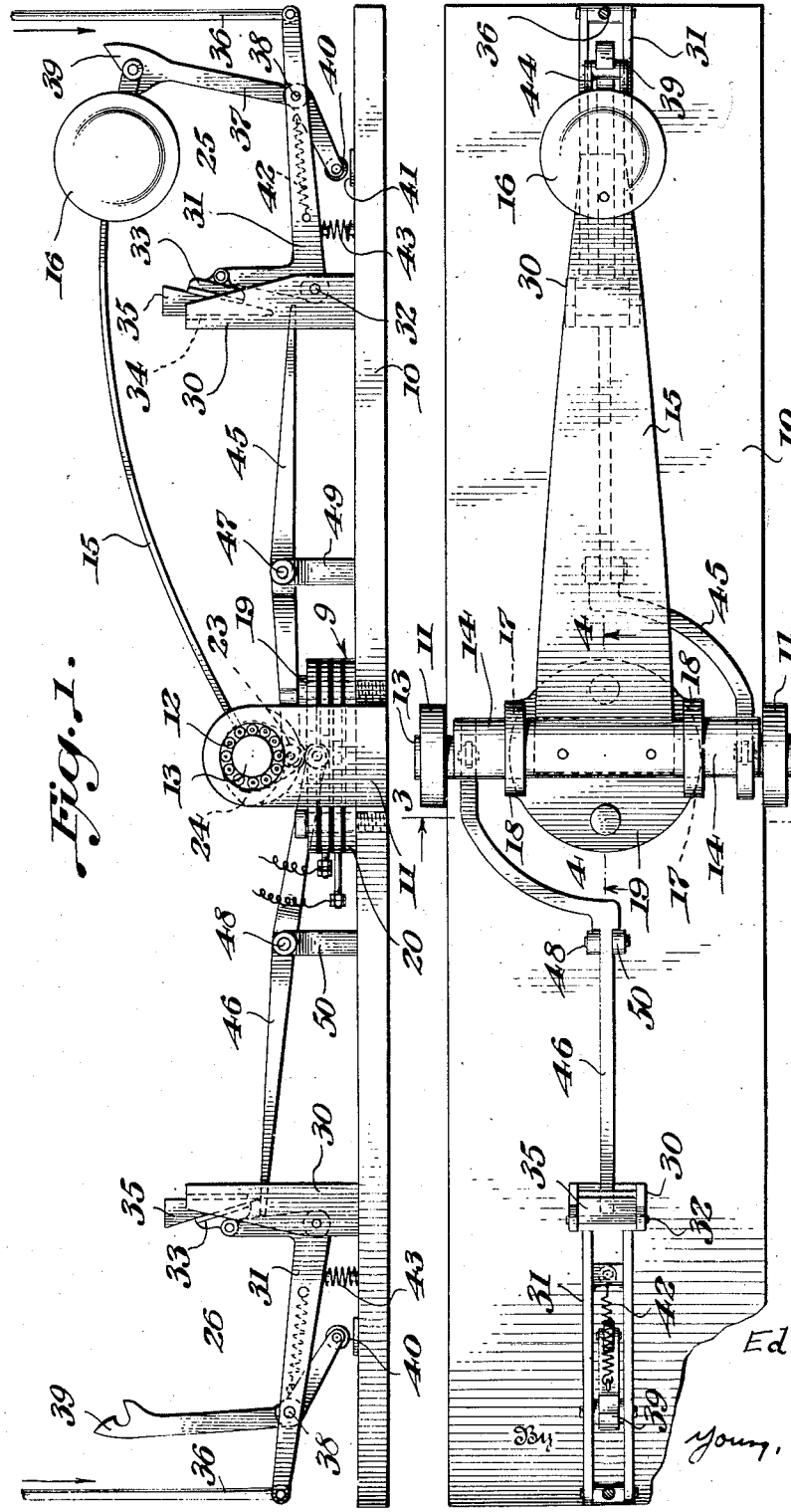
Inventor,
Edwin E. Foster
By Young, Emery & Thompson
Attorneys Dec. 2, 1947.  E. E. FOSTER  2,431,689
WELDING RHEOSTAT
Filed Aug. 16, 1944  2 Sheets-Sheet 2

Inventor,
Edwin E. Foster

Patented Dec. 2, 1947

2,431,689

UNITED STATES PATENT OFFICE 2,431,689

WELDING RHEOSTAT

Edwin E. Foster, Austin, Tex.

Application August 16, 1944, Serial No. 549,732

14 Claims. (Cl. 201—51)

The invention relates to a device for applying a high pressure for a certain time or periodically at a certain rate per minute. While the invention is applicable to many different uses where heavy pressure is required, either periodically or for certain time durations, with the lowest expenditure of energy, the apparatus shown and described is one which is applied, by way of example, in the field of welding.

It is therefore an object of the invention to provide a device which will apply and release a pressure of approximately sixty tons on a carbon disc, the pressure to be applied at a rate of approximately two hundred times per minute. In electric welding the more pressure which is applied on the carbon disc the more current will pass through the disc to perform the operation of flash welding. When thus operating at two hundred times per minute the device performs a series of welds which are termed "seam welding." A further object of the invention resides in applying the "bouncing ball principle" to accomplish the periodic series of pressure applications and releases.

Further objects will be apparent from the following description when considered in connection with the accompanying drawings in which;

Figure 1 is a side elevation of the mechanism,

Fig. 2 is a plan view of the mechanism,

Figure 3:
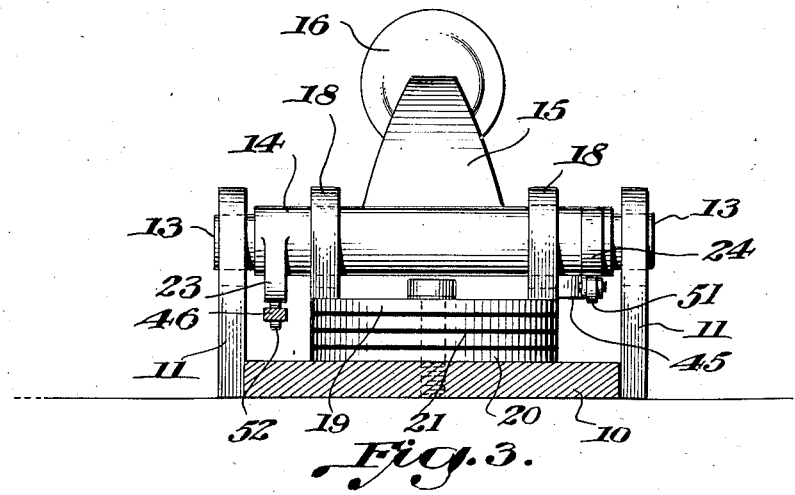
Fig. 3 is a cross section taken on line 3—3 of Fig. 2 in the direction of the arrows.
Figure 4:
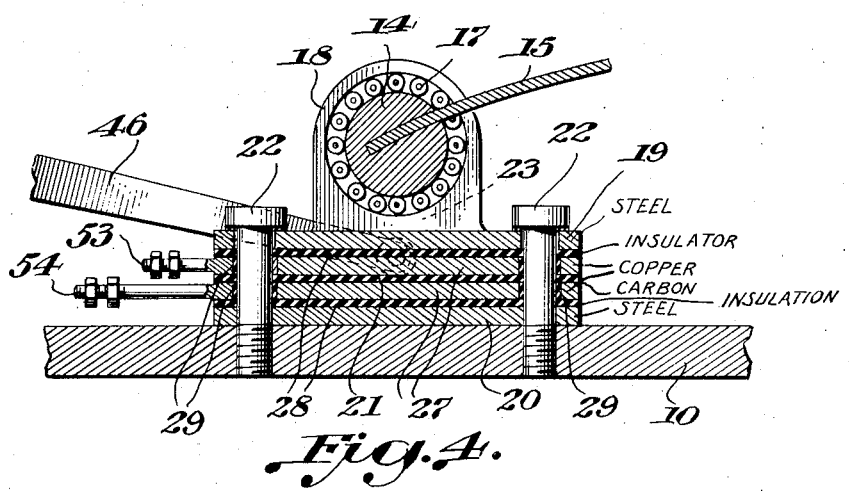
Fig. 4 is a sectional view through the mechanism taken on line 4—4 of Fig. 2 in the direction of the arrows.

The drawings illustrate the invention as applied to a rheostat device in an electric welding apparatus as a preferred practical application of the invention. This rheostat may be used in series with a storage battery or other source of electric energy and a spot welder which are well known. For each spot weld the electrodes of the welder come into contact first and then the rheostat is closed by applying the heavy pressure. This allows a flash of current to accomplish the welding operation and the current is then interrupted by first removing the pressure and then opening the electrodes from the parts being spot welded. The mechanism according to the invention applies, holds and releases a pressure.

The rheostat 9 is mounted on a base plate 10 having two upright bearing blocks or posts 11 secured thereto preferably at opposite sides thereof. Each block 11 is provided with a roller bearing 12 to rotatably mount therein a heavy shaft having end portions 13 rotatable in the bearings and an eccentric intermediate portion 14. The portion 14 has one end of a tapered leaf spring 15 mounted in a slot therein of which the other end has a heavy weight or ball 16 secured thereon. A pair of ball or roller bearings 17 are mounted on the portion 14 and each bearing 17 is secured in a bearing block 18 of which there are two secured to a heavy steel plate or disc 19. A second heavy steel plate 20 is mounted and secured on the base plate 10 and between the two plates 19 and 20 a carbon disc 21 is provided between copper plates or discs 27 separated by insulation discs 28 between each disc 27 and its steel plate 19 and 20. The plates 19, 20, 27 and 28 and the disc 21 are preferably circular as viewed in plan, Fig. 2, with approximate ten inch diameters, but these elements may have any other desired configuration and size. A pair of guide bolts 22 are secured in the base plate 10 and these bolts pass through the plates 19, 20, 27 and 28 as well as disc 21 with insulating sleeves 29 surrounding them to insulate the carbon disc 21 from the copper plates 27. The eccentric portion 14 also has a pair of cams 23 and 24 secured thereon arranged approximately 90° relative to each other as seen in Fig. 1.

The device includes a pair of overrunning clutch latches 25 and 26 and since both latches are identical in structure and operation one of them will be specifically described.

The clutch is mounted on an upright member or U-shaped post 30 and comprises a double bell crank lever 31 pivoted at 32 in the post and having at one end a clutch face 33 pivoted thereto. The other side of the clutch face 34 is mounted on the post 30 and a wedge member 35 cooperates with these faces with a sliding adjustable motion. A push link 36 is connected on the other end of the lever 31 between this end and the pivot 32 and a latch or double-armed lever 37 is pivoted at 38 to the lever 31. This lever 37 has a hook member 39 at one end and a roller 40 at the other end, the latter cooperating with a release plate or disc 41 mounted on the base 10. A small tension spring 42 is connected at one end to the lever 31 and the other end to the lever 37 to maintain the lever 37 in approximately vertical position in its unlatched position, as shown in Fig. 1 in connection with clutch 26. Also a small compression spring 43 constantly tends to urge the lever 31 counter-clockwise for clutch 25 and clockwise for clutch 26.

Each clutch latch 25 and 26 is provided with a setting lever 45 and 46 respectively pivoted at 47 and 48 respectively on a post 49 and 50 respectively. The lever 45 cooperates by means of a suitable roller 51 with the cam 24 and the lever 46 cooperates with the cam 25 also by a suitable roller 52.

The copper discs 27 may be provided with suitable terminal posts 53 and 54 to which the electric wires may be connected.

The two guide bolts 22 also act as limit stops in the extreme "up" position of the top plate 19. In the position shown in Fig. 1, the heavy weight 16 has been forced downward until it is caught by the overrunning clutch latch 25, which holds it in this pressure applied position. Due to the very small off-set on the eccentric, the carbon disc 21 is under enormous pressure in this position. For instance, a fifty pound weight on the end of a thirty inch spring and a $\frac{1}{16}$" offset on the eccentric would develop about sixty tons pressure, due to the fact that the fifty pound weight is equivalent to about two hundred and fifty pounds at the bottom of its stroke. In order to replace the small amount of energy lost in mechanical friction and air friction, the push link 36 is operated downward, which further loads the leaf spring 15, before releasing the latch 39 at the time the roller 40 contacts the plate 41. When the latch 39 has been released, the loaded spring 15 will throw the weight 16 counter-clockwise, lifting the plate 19 and its copper disc 27 slightly out of contact with the carbon disc 21, and the kinetic energy in the weight 16 will be re-absorbed by flexing the spring 15 in the opposite direction until the weight 16 is caught by the other over-running clutch latch 26. During this counter-clockwise stroke the first over-running clutch latch mechanism 25 is reset by lifting the wedge 35 by means of the lever 45, the roller 51 and the cam 24, the latter of which is fixed directly to the shaft 14. The over-running clutch latch mechanisms are identical and a small amount of energy is added at each end of the stroke. The control push links 36 are to be connected to a timing mechanism, not shown, and the timing mechanism determines the length of time the pressure is allowed to remain on the carbon disc during each weld, and also the length of time between strokes.

The invention is not limited to the specific use and structure shown and described as certain parts may be used separately or conjointly with others. Also the mechanism is applicable where heavy pressures are required either momentarily, periodically or for certain time limits and intervals.

I claim as my invention:

1. A pressure applying device particularly for electric welding apparatus and systems, comprising a base plate, a pair of upright posts secured to the base plate, an eccentric shaft rotatably mounted in bearings in the upright posts, a pressure responsive rheostat mounted on the base plate under the eccentric shaft, and pendulum means secured to the eccentric shaft to periodically apply and release pressure on the rheostat as the means swings in its pendulum path, said means including a leaf spring with a weight at one end and the other end secured in the eccentric shaft.

2. A pressure applying device particularly for electric welding apparatus and systems, comprising a base plate, a pair of upright posts secured to the base plate, an eccentric shaft rotatably mounted in bearings in the upright posts and having a pair of cam members mounted thereon, a pressure responsive rheostat mounted on the base plate under the eccentric shaft and connected thereto in bearing members, a pendulum mounted in the eccentric shaft to swing in its pendulum path in an arc over the base plate from one side of the rheostat to the other, and means on each side of the rheostat to hold the pendulum to apply pressure on the switch through the bearing members thereof.

3. A pressure applying device according to claim 2, in which means are provided to release the pendulum after each holding and pressure operation on the switch.

4. A pressure applying device according to claim 2, in which means are provided to release the pendulum after each holding and pressure operation on the switch, and a pair of over-running clutch members are provided mounted on opposite sides of the rheostat and each operable by a cam member on the eccentric shaft.

5. A pressure applying device particularly for electric welding apparatus and systems, comprising a rheostat having a carbon disc, a leaf spring pendulum mounted to swing over the rheostat whereby at the end stroke of each swing of the pendulum a high pressure is applied on the carbon disc during each welding operation, and means at each end stroke of the pendulum to hold the latter from its back swing until released.

6. A pressure applying device particularly for electric welding apparatus and systems, comprising a rheostat having a carbon disc mounted between two metal discs, an eccentric shaft mounted over the rheostat and having means connecting it to the rheostat, and a leaf spring pendulum secured in the eccentric shaft and adapted to swing over the rheostat from one side to the other to apply a high pressure on the carbon disc at each end of the pendulum swing during each welding operation.

7. A pressure applying device particularly for electric welding apparatus and systems, comprising a rheostat having a carbon disc mounted between two metal discs, an eccentric shaft mounted over the rheostat and having means connecting it to the rheostat, a leaf spring pendulum secured in the eccentric shaft and adapted to swing over the rheostat from one side to the other to apply a high pressure on the carbon disc at each end of the pendulum swing during each welding operation, and means for holding the pendulum at each end swing until released.

8. A pressure applying device particularly for electric welding apparatus and systems, comprising a rheostat having a carbon disc mounted between two metal discs, an eccentric shaft mounted over the rheostat and having means connecting it to the rheostat, a leaf spring pendulum secured in the eccentric shaft and adapted to swing over the rheostat from one side to the other to apply a high pressure on the carbon disc at each end of the pendulum swing during each welding operation, and means for holding and releasing the pendulum at each end swing thereof.

9. A pressure applying device particularly for electric welding apparatus and systems, comprising a rheostat having a carbon disc mounted between two metal discs, an eccentric shaft mounted over the rheostat and having means connecting it to the rheostat, a leaf spring pendulum secured in the eccentric shaft and adapted to swing over the rheostat from one side to the other to apply a high pressure on the carbon disc at each end of the pendulum swing during each welding operation, means for holding and releasing the pendulum at each end swing thereof, and an over-running clutch for each holding and releasing means so that the pendulum will be held at the bottom of its swing stroke.

10. A pressure applying device particularly for electric welding apparatus and systems, comprising a base plate, a pair of upright posts secured to the base plate, an eccentric shaft rotatably mounted in bearings in the upright posts and having a pair of cam members mounted thereon, a pressure responsive rheostat mounted on the base plate under the eccentric shaft and connected thereto in bearing members, a pendulum mounted in the eccentric shaft to swing in its pendulum path in an arc over the base plate from one side of the rheostat to the other, said pendulum being in the form of a leaf spring secured at one end in the eccentric shaft and the other end having a weight thereon, and an overrunning clutch latch mounted on each end of the base plate to hold the pendulum at its end stroke to apply pressure on the rheostat through the bearing members.

11. A pressure applying device particularly for electric welding apparatus and systems, comprising a base plate, a pair of upright posts secured to the base plate, an eccentric shaft rotatably mounted in bearings in the upright posts and having a pair of cam members mounted thereon, a pressure responsive rheostat mounted on the base plate under the eccentric shaft and connected thereto in bearing members, a pendulum mounted in the eccentric shaft to swing in it pendulum path in an arc over the base plate from one side of the rheostat to the other, means on each side of the rheostat to hold the pendulum to apply pressure on the rheostat through the bearing members thereof, and means operative by a cam member to reset the clutch latch which is opposite the pendulum in its latched position.

12. A pressure applying device particularly for electric welding apparatus and systems, comprising a base plate, a pair of upright posts secured to the base plate, an eccentric shaft rotatably mounted in bearings in the upright posts and having a pair of cam members mounted thereon, a pressure responsive rheostat mounted on the base plate under the eccentric shaft and connected thereto in bearing members, a pendulum mounted in the eccentric shaft to swing in its pendulum path in an arc over the base plate from one side of the rheostat to the other, means on each side of the rheostat to hold the pendulum to apply pressure on the rheostat through the bearing members thereof, and means operative by a cam member to reset the clutch latch which is opposite the pendulum in its latched position, said last-mentioned means including a lever pivoted on the base plate and a wedge member which is actuated by the lever upon resetting the clutch latch.

13. A pressure applying device particularly for electric welding apparatus and systems, comprising a rheostat, a shaft over the rheostat, a spring bar with a weight at one end and secured and mounted in the shaft at the other end, said bar and weight being capable of swinging as a pendulum with the shaft as a pivot, means on the shaft cooperating with the rheostat to limit the rotary movement of the shaft, and means to receive and hold the weight and bar at the end of a stroke of the pendulum movement of the bar and weight to apply a high pressure on the rheostat by the first-named means.

14. A pressure applying device according to claim 13, in which the holding and receiving means is an over-running clutch latch effective to secure direct contact with the weight.

EDWIN E. FOSTER.

REFERENCES CITED

The following references are of record in the file of this patent:

UNITED STATES PATENTS

| Number | Name | Date |
| --- | --- | --- |
| 1,213,809 | Ray | Jan. 23, 1917 |
| 1,335,022 | Papini | Mar. 30, 1920 |
| 1,690,689 | McCabe | Nov. 6, 1928 |
| 1,804,709 | Shoenberg | May 12, 1931 |
| 1,976,534 | Apple | Oct. 9, 1934 |